US012748660B1

(12) United States Patent
Kumar Shivakumar et al.

(10) Patent No.: US 12,748,660 B1
(45) Date of Patent: Sep. 29, 2026

(54) ERROR-CORRECTING AND ERROR-DETECTING PARITY-CHECK MATRIX TO STORE A KNOWN BAD DATA BIT IN A MEMORY SYSTEM

(71) Applicant: Synopsys, Inc., Sunnyvale, CA (US)

(72) Inventors: Abhishek Kumar Shivakumar, Pathanamthitta (IN); Biswanath Tayenjam, Bangalore (IN)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/760,908

(22) Filed: Jul. 1, 2024

(51) Int. Cl.
*G06F 11/10* (2006.01)

(52) U.S. Cl.
CPC ................................ *G06F 11/1048* (2013.01)

(58) Field of Classification Search
CPC .................................................. G06F 11/1048
See application file for complete search history.

(56) References Cited

U.S. PATENT DOCUMENTS

| | | | | |
|---|---|---|---|---|
| 5,502,732 A * | 3/1996 | Arroyo | G11C 29/02 714/724 |
| 6,397,357 B1 * | 5/2002 | Cooper | G11C 29/02 714/763 |
| 2017/0286197 A1 * | 10/2017 | Halbert | G11C 29/02 |
| 2020/0371873 A1 * | 11/2020 | Schaefer | G11C 11/221 |

OTHER PUBLICATIONS

C.L.Chen, M. Y. Hsiao, "Error-Correcting Codes for Semiconductor Memory Applications: A State-of-the-Art Review," IBM J. Res Develop, vol. 28, No. 2, Mar. 1984, pp. 124-134.
M. Y. Hsiao, "A Class of Optimal Minimum Odd-weight-column SEC-DED Codes," IBM J. Res Develop, vol. 14, No. 4, Jul. 1970, pp. 395-401.
Ayem, Fradi et al., "A New Efficient Self-Checking Hsiao SECDED Memory Error Correcting Code," 2011 IEEE, 5 pages.
Richter, Michael et al., "New linear SEC-DED codes with reduced triple error miscorrection probability," Potsdam University, 14482 Potsdam, Germany, Infineon Technologies AG, 14th IEEE International On-Line Testing Symposium 2008, 6 pages.

* cited by examiner

*Primary Examiner* — Joseph D Torres
(74) *Attorney, Agent, or Firm* — WOMBLE BOND DICKINSON (US) LLP

(57) ABSTRACT

A system includes: an error correction code (ECC) memory controller configured to read data stored in a memory, the data including a read codeword including system data and parity data, the ECC memory controller including an ECC decoder configured to: compute a syndrome based on the read codeword using a parity-check matrix including a plurality of columns, wherein a first group of syndromes calculated by the parity-check matrix in a case where the read codeword has a double-bit error and a virtually stored known bad data bit is set and a second group of syndromes calculated by the parity-check matrix in a case where the read codeword has a single-bit error or zero errors are disjoint; and in a case where the read codeword received has a double bit error and a virtually stored known bad data bit, detect an error and output an indication of detection of the error.

14 Claims, 7 Drawing Sheets

ERROR-CORRECTING AND ERROR-DETECTING PARITY-CHECK MATRIX TO STORE A KNOWN BAD DATA BIT IN A MEMORY SYSTEM

TECHNICAL FIELD

The present disclosure generally relates to a memory system. In particular, the present disclosure relates to error correction codes implemented in a memory controller for computer memory.

BACKGROUND

A memory controller provides an interface to a computer memory, such as dynamic random-access memory (DRAM). Data corruption can sometimes occur in computer memory, due to electrical or magnetic interference, such as due to cosmic rays. Such data corruption can be unacceptable in various use cases, such as for scientific and financial computing applications, databases, file servers, and avionics.

The above information disclosed in this Background section is only for enhancement of understanding of the background of the invention and therefore it may contain information that does not constitute prior art.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to error-correcting and error-detecting parity-check matrix to store a known bad data bit in a memory system.

Computer memories are vulnerable to data corruption. For example, background radiation such as cosmic rays (high-energy particles from outer space) interact directly or indirectly with memory cells of computer memories to cause the values of bits stored in the memory cells to flip. Such data corruption can be unacceptable in various use cases, such as for scientific and financial computing applications, databases, file servers, and avionics. In addition, rates of data corruption can vary based on the level of radiation in the operating environment (e.g., high altitude and/or radioactive environments).

Figure 1A:
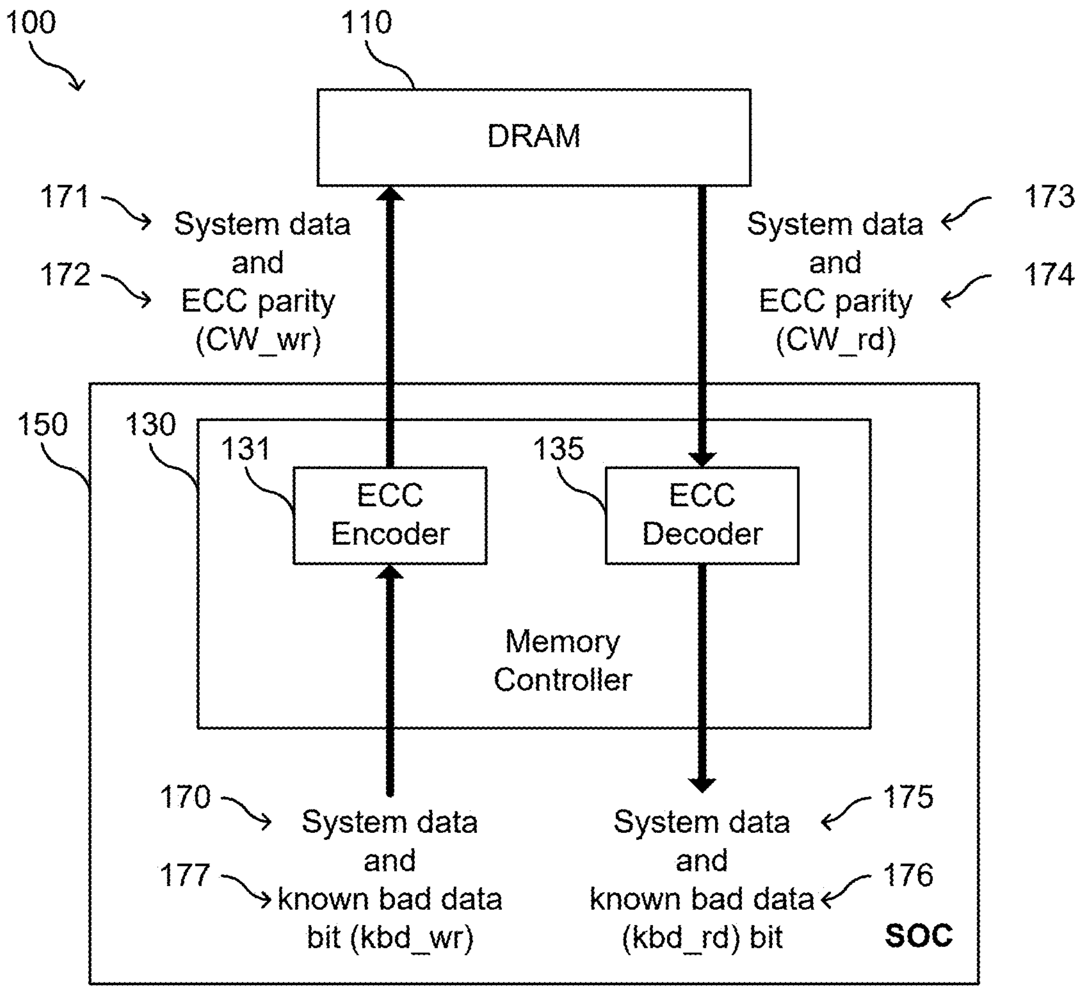
FIG. 1A is a block diagram illustrating a memory subsystem of a computer system, which includes a memory controller for error correction code (ECC) memory, according to one embodiment of the present disclosure.
Figure 7:
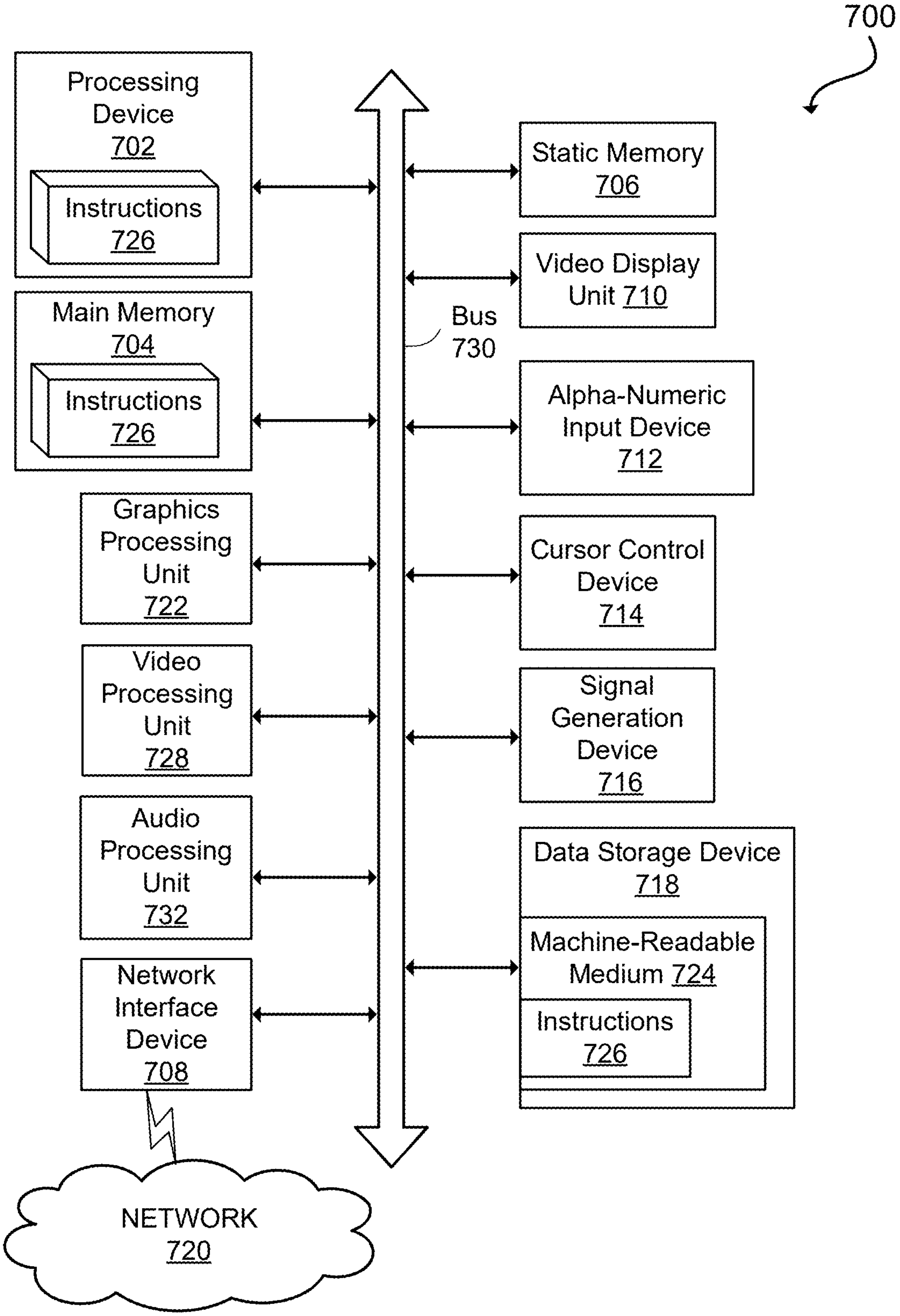
FIG. 7 depicts a diagram of an example computer system in which embodiments of the present disclosure may operate.

FIG. 1A is a block diagram illustrating a memory subsystem of a computer system, which includes a memory controller for error correction code (ECC) memory, according to one embodiment of the present disclosure. In the example shown in FIG. 1A, the illustrated portions of a memory subsystem 100 includes dynamic random-access memory (DRAM) or computer memory 110, which is connected to a memory controller 130. FIG. 7, described in more detail below, provides one example of a computer system 700 that may include such a memory subsystem 100, where the DRAM 110 may correspond to the main memory 704, and the memory controller may be integrated in the processing device 702 or connected between the processing device 702 and the main memory 704 via the bus 730. The memory controller 130 is shown as being a component within a system-on-chip (SOC) 150, although embodiments of the present disclosure are not limited thereto and may also apply to memory subsystems of computer systems in which the memory controller is separate from other processing circuits (such as cores of a central processing unit, cores of a graphics processing unit, and input/output controllers, and the like) that may be included in a package of a system-on-chip.

Error correction code memory (ECC memory) is a type of computer data storage that uses an error correction code (ECC) to detect and correct data corruption which occurs in memory. A memory controller 130 is configured to write data (e.g., system data 170 as shown in FIG. 1A) to a computer memory 110 and/or to read data from the computer memory 110 (the reading and writing may be implemented using separate circuits). When writing system data 171 (or application data), in the case of ECC memory, the memory controller 130 uses an ECC encoder 131 to compute write parity bits or write check bits based on content of the data to be stored. These write parity bits or check bits 172 may be stored together with the write system data 171. When reading the received system data 173 back from memory 110, the memory controller 130 also reads the received check bits 174 and an ECC decoder 135 of the memory controller 130 performs a computation to detect and/or correct errors in the received system data 173 using the received check bits 174. Generally, the number of errors that can be detected and/or corrected is limited by the number of check bits (additional data) that are used in the error correction code. For example, some ECC memories support single error correction, double error detection (SECDED), meaning that the error correction code protecting the data can correct a single bit flip (a single bit of the system data or the ECC parity data has been corrupted) in the stored data and can also detect when there have been two bit flips (two bits have been corrupted) but cannot determine how to correct those two corrupted bits (e.g., because there is not enough information to determine which two bits have been corrupted and are now incorrect).

Figure 1B:
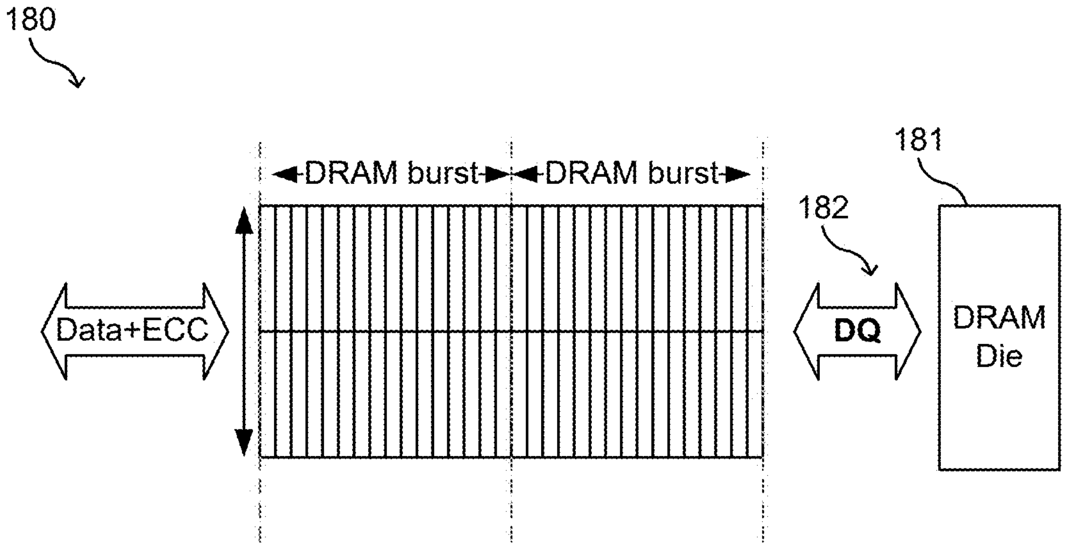
FIG. 1B is a schematic diagram of an interface between a die (or chip) of the memory and a memory controller, according to one embodiment of the present disclosure.

FIG. 1B is a schematic diagram of an interface 180 between a die (or chip) 181 of the memory 110 and a memory controller 130. The example interface shows interchange of system data and ECC parity data between memory controller and DRAM over a data bus 182 (e.g., a DQ bus). Some aspects of embodiments of the present disclosure will be described using a SECDED[272,256] code as the ECC code, indicating that 256 bits of system data or user data are encoded as a 272 bit codeword (CW), meaning that there are 16 ECC parity bits for the 256 bits of system data. The example shown in FIG. 1B indicates that a DRAM burst is used to transmit the 256 bits of system data and 16 bits ECC parity data over the data bus.

The ECC decoder 135 may return the output system data 175 that was retrieved from the memory 110. In a case where the ECC decoder 135 detected no errors, then the received system data 173 as retrieved from the memory 110 is provided as output. In a case where the ECC decoder 135 detected a single error in the received system data 173, then corrected output system data 175 is returned (where the error in the received system data 173 is corrected). In a case where the ECC decoder 135 detected two errors, then the received system data 173 is output (because the multiple errors could not be corrected). The ECC decoder 135 is shown in the embodiment of FIG. 1A as also returning an output known bad data (KBD) bit 176 indicating whether the associated output system data 175 is bad (e.g., because the ECC decoder 135 detected more than one error and could not correct those errors). For example, a KBD bit value of 1 may indicate that the associated output system data 175 is known to be bad or corrupted, and a KBD bit value of 0 may indicate that the data is clean or good or uncorrupted. As would be understood by those skilled in the art, other error correction codes (other than a SECDED code) may have different properties where such codes may be able to, for example, correct multiple errors and detect more than two errors. The operation of the ECC decoder 135 and the setting of the output KBD bit 176 would be modified accordingly.

In some computer systems, data is copied between various subsystems, where these may include separate hardware devices (e.g., specialized processors or peripheral devices) and/or different software subsystems (e.g., different programs executed by the same or different computer processors). In some circumstances, the data may be corrupted during transfer, application error, or the like. A subsystem of the computer system can detect this corruption in manner appropriate to the application, for example, by computing a checksum or hash function on the data and comparing the computed value to an expected value or based on detecting an error or exception raised during the computation or collection of the data. When a subsystem determines that it is writing known bad data (KBD) to memory, the data should be flagged as such, so that downstream consumers of this data can process it appropriately (e.g., by discarding or ignoring the data). In the example shown in FIG. 1A, the ECC encoder 131 also receives an input known bad data (KBD) bit 177, indicating whether the input system data 170 is known to be corrupted (e.g., having a value of 1 when the input system data 170 is known to be corrupted).

However, some ECC memory devices do not include dedicated space to store a known bad data bit or flag or tag (KBD bit). For example, the DRAM die 181 shown in FIG. 1B may have a geometry that stores data in lengths equal to the codeword (e.g., 272 bits, which is the sum of the length in bits of the system data and the length in bits of the parity data), which may be referred to as having a memory width equal to the length of the codeword. As such, the memory width is smaller than the sum of the length in bits of the system data (e.g., 256 bits), the length in bits of the parity data (e.g., 16 bits), and the length in bits of the known bad data bit (e.g., 1 bit).

One approach to storing the KBD bit in the ECC memory is to virtually store the KBD bit using the parity data. To be concrete, in these examples, the KBD bit will have a value of 1 if the data is known bad data and will have a value of 0 otherwise (e.g., if the data has not been shown to be corrupted), although embodiments of the present disclosure are not limited thereto. To virtually store the KBD bit, it is treated as if it was part of the system data when computing the parity data (e.g., by computing the parity based on the 257 bits made up of the 256 bits of system data and the 1 bit of the KBD bit). The system data (e.g., the original 256 bits) and the computed parity data are then stored in the memory, without including the known bad data bit as part of the codeword. When reading the system data back from memory and decoding the data to detect and correct errors, the KBD bit is assumed to have a value of 0. When the ECC decoder 135 detects a single bit error (or 1-bit error) at the KBD bit, it is assumed that the KBD bit had a value of 1 at the time of computing the parity data, thereby recovering the virtually stored KBD bit.

A problem arises when the KBD bit has a value of 1 and two bits of system data are corrupted after being written to the memory 110, because there are now effectively three errors in the stored data, and the error correction code SECDED[273,257] is merely capable of single error correction and double error detection. In some circumstances, the ECC decoder 135 performing decoding operations will detect a single error (e.g., a correctable error) even though there are actually three errors. This can cause downstream consumers of the data to mistakenly trust the data as if it were good, even though it was written to the ECC memory as known bad data. This also violates the stated guarantee that the ECC memory provides single error correction and double error detection (SECDED) protection to system data, because the two errors were not detected.

Aspects of embodiments of the present disclosure relate to a system and method for encoding the data (e.g., using a memory controller) to be stored in an error correction code memory (ECC memory) such that single error correction, double error detection (SECDED) protection is provided to system data while also virtually storing a known bad data (KBD) bit (or flag or tag) in the parity data of the ECC memory. Aspects of embodiments of the present disclosure similarly relate to decoding data stored in a manner such that the case of two bit flips of stored known bad data is reliably detected. Some aspects of embodiments of the present disclosure further relate to methods for computing the values of a parity matrix for performing the encoding and decoding operations in the ECC memory controller.

Technical advantages of the present disclosure include, but are not limited to, improving the operation of computer systems by reliably detecting two errors in system data, including in all cases where a known bad data bit (or flag or tag) is stored by virtually storing the known bad data bit in the parity data computed for the system data. This prevents the propagation of bad data to other subsystems, thereby improving the operation of the overall computer system and/or applications depending on the reliability of the system data (e.g., navigation systems, avionics systems relying on sensor data, financial systems, and the like). Embodiments of the present disclosure further reduce costs (and improve space efficiency) by providing the functionality of storing a KBD bit along with the SECDED protection for the system data, without increasing the size of the memory to store the known bad data bit (e.g., expanding memory width by 1 bit to store the KBD bit).

In an error correction code (ECC) system, an ECC encoder 131 generates codewords from input data and an ECC decoder 135 checks received codewords for errors using the parity data stored in the codeword. One representation of the operations performed by the ECC encoder 131 uses a generator matrix G to generate codewords from input data (e.g., the input system data), and the ECC decoder 135 uses a parity-check matrix H to check the codeword for errors. In some embodiments, the parity-check matrix H is stored in a read-only memory (ROM) internal to the ECC decoder 135, where the values of the parity-check matrix H are fixed in the read-only memory during manufacturing or fabrication of the ECC decoder 135. In some embodiments, the generator matrix G is stored in a read-only memory of the ECC encoder 131. In some embodiments, the ECC decoder 135 and the ECC encoder 131 share a read-only memory of the memory controller 130 storing the parity-check matrix H and the generator matrix G. The relationship between the generator matrix G and the parity-check matrix H is shown in Equation 1:

$$GH^T = 0 \tag{1}$$

where the $H^T$ indicates the transpose of matrix H.

This equation ensures that the code generated by generator matrix G is orthogonal to the code detected by parity-check matrix H, thereby enabling error detection and correction. The parity check matrix H of such code has the following properties: A first property is that no columns of the matrix are all zeroes. This property ensures all single bit errors cause a non-zero error syndrome (multiplying the received system data and ECC parity data by the parity-check matrix H generates syndromes corresponding to the symbols of the codeword, where a syndrome having a non-zero value indicates the existence of an error). A second property is that all columns are unique. This property guarantees that the syndromes of all single bit errors are unique. A third property is that the XOR-sum of any two columns must not equal any other column vector. The syndrome resulting from a double bit error (or dual bit error or 2-bit error) is determined by calculating the XOR-sum of the two columns corresponding to the bits in error. The second property guarantees that the XOR-sum of any two distinct column vectors is non-zero and this ensures double bit errors are 100% detectable. Furthermore, the third property ensures that double bit errors produce syndromes distinct from those of single bit errors and this will avoid mis-correction of double bit error to single bit error.

Figure 2B:
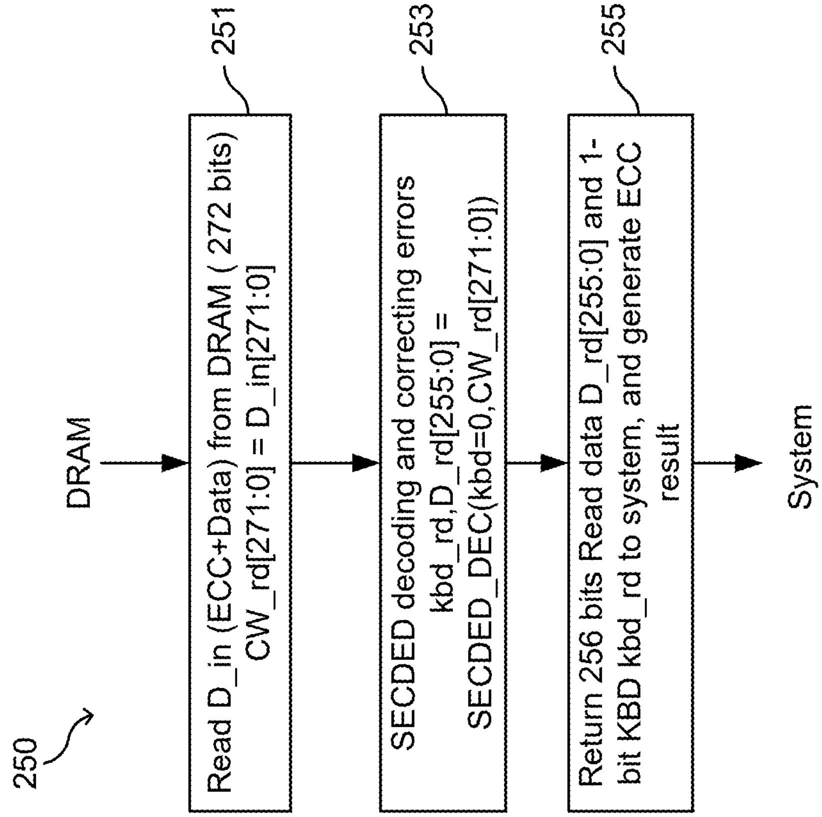
FIG. 2B is a flowchart depicting a method for reading system data and known bad data bit from ECC memory using an ECC decoder of a memory controller, according to one embodiment of the present disclosure.
Figure 2A:
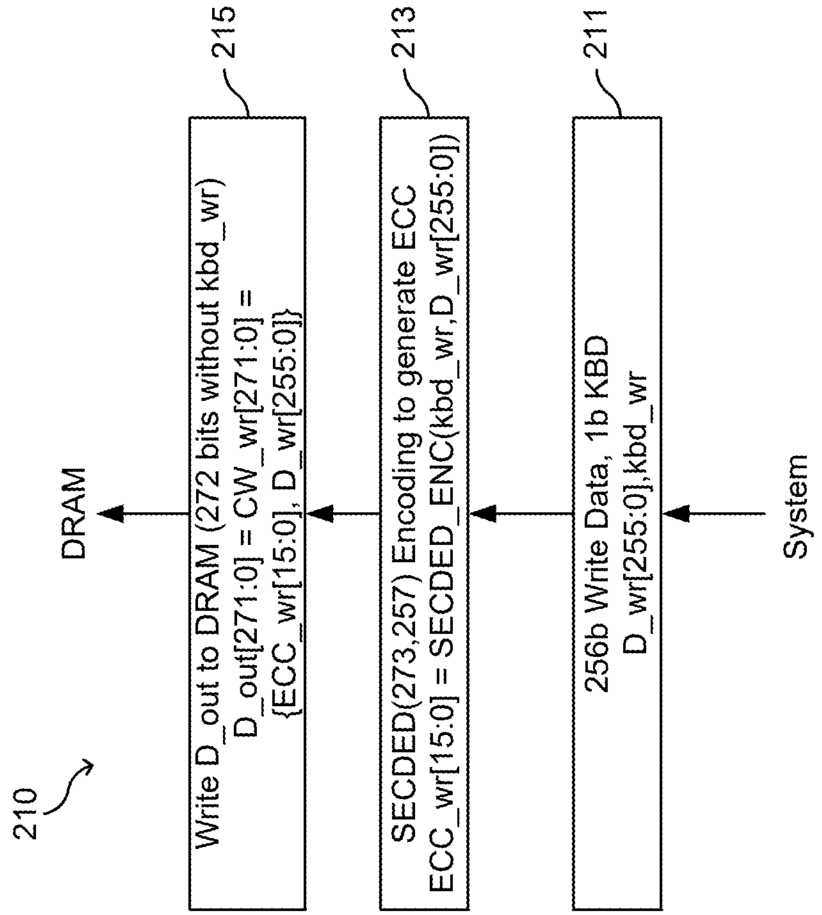
FIG. 2A is a flowchart depicting a method 210 for writing system data and known bad data bit to ECC memory using an ECC encoder of a memory controller, according to one embodiment of the present disclosure.

FIG. 2A is a flowchart depicting a method 210 for writing system data and known bad data bit to ECC memory using an ECC encoder of a memory controller according to one embodiment of the present disclosure. At 211, the ECC encoder 131 receives 256 bits (256b) of system data (D_wr [255:0]) to be written along with one bit (1b) representing the known bad data bit (kbd_wr). At 213, the ECC encoder 131 implements a SECDED[273,257] code to encode the 257 bits of input data as a 273 bit codeword by generating 16 bits of ECC parity data (ECC_wr[15:0]) or check bits. This is implemented using a SECDED encoding process (SECDED_ENC), which takes the known bad data bit or flag (kbd_wr) and the system data to be written (D_wr[255:0]) as inputs.

In more detail, the ECC encoder 131 implementing an (n, k) linear block code (in the example of SECDED[273,257], n=273 and k=257) for the SECDED encoding generates an n-bit codeword (denoted C) from k-bit data (k bits of system data or user data, denoted as m) using a k×n generator matrix G:

$$C = mG \tag{2}$$

where $G_{k\times n}=[I_{k\times k}|P]$, where I is the identity matrix (e.g., a square matrix with the value of 1 at each position along the diagonal from top left to bottom right and the value 0 everywhere else), and where P is a k×(n−k) parity matrix, whose values will be described in more detail below.

At 215, the ECC encoder 131 writes D_out to the memory 110, where D_out is the 272 bits of the codeword computed by the ECC encoder 131, excluding the kbd_wr bit, e.g., the 16 bits of the computed check bits or ECC parity data (ECC_wr[15:0]) concatenated with the 256 bits of the system data (D_wr[255:0]) to form a codeword to be written, which may also be referred to as a write codeword (CW_wr[271:0]).

FIG. 2B is a flowchart depicting a method 250 for reading system data and known bad data bit from ECC memory using an ECC decoder of a memory controller according to one embodiment of the present disclosure.

At 251, the ECC decoder 135 reads n bits (272 bits) of data from the memory 110, where this data (D_in) is a codeword (a read codeword CW_rd[271:0]) that includes both received system data 173 and received check bits 174. The read codeword CW_rd[271:0] may differ from the write codeword CW_rd[271:0] depending on whether the stored data was corrupted between being written to the memory 110 and being read from the memory (whether corrupted in transit from the memory controller 130 to the memory 110, while residing in memory 110, or in transit from the memory 110 to the memory controller 130).

As such, the received codeword which may have an error e and therefore may be denoted as received codeword $C_e$. An invalid pair of system data and ECC parity data due to an error is referred to as an invalid codeword. At 253, the ECC decoder 135 supplies an assumed value of the KBD bit being 0 (kbd=0, which may be referred to as the known bad data bit being unset or the flag being cleared) and the received codeword $C_e$ as inputs to a SECDED decoding procedure (SECDED_DEC(kbd=0,CW_rd[271:0]) to compute syndromes s using the parity-check matrix H in accordance with:

$$s = C_e H^T \tag{3}$$

where $H_{(n-k)\times n} = \left[P^T \,\middle|\, I_{(n-k)\times(n-k)}\right]$

The relationship between the data read from the DRAM (D_in) and the data written to the DRAM (D_out) can be described as following:

$$D\_in[272:0] = D\_out[272:0] + \text{Errors}$$

If the number of the errors is zero or one, then any errors can be corrected by the SECDED(273,257) ECC code. As the result, D_in[255:0] is equal to D_out[255:0] and the known bad data bit that is read from DRAM (kbd_rd) is the same as the known bad data bit (kbd_wr) that was received by the ECC encoder 131. However, if the number of the errors is greater than 1, then these errors cannot be corrected by the SECDED ECC code.

At 255, if the computed syndrome s equals zero (indicating zero errors), then the ECC decoder 135 determines that the received codeword $C_e$ is valid; otherwise, it indicates an error.

In a case where the received codeword $C_e$ is valid, the ECC decoder 135 outputs the system data from the received codeword $C_e$ and outputs an indication that there is no correctable error (CE=0) and no uncorrectable error (UE=0). When the received codeword $C_e$ is valid, then the value of the virtually stored known bad data bit was 0, and therefore the ECC decoder 135 also outputs a read known bad data bit having value 0 (kbd_rd=0).

In cases where a non-zero syndrome corresponds to a single bit error syndrome (any column in the parity check matrix) in the system data or the ECC parity bits, then the ECC decoder 135 corrects the received codeword $C_e$, outputs the system data from the corrected version of the received codeword and outputs an indication of the presence of a correctable error (CE=1) and no un-correctable error (UE=0). If the single bit error is detected at the known bad data bit, then this correction causes the known bad data bit to be corrected from the assumed value of 0 to the proper value of 1 (e.g., as supplied to the ECC encoder 131), such that kbd_rd=1, and the ECC decoder 135 outputs the system data from the received codeword $C_e$.

If the syndrome indicates more than one bit of error, then the received codeword $C_e$ is classified as uncorrectable and the ECC decoder 135 outputs an indication of this corruption of the data (e.g., by setting the known bad data bit 176 in the output as kbd_rd=1 and by outputting an indication of an un-correctable error UE=1). In this case, the output may also include an indication that there was no correctable error (CE=0). The output of known bad data and uncorrectable error should be the same whether there is a double bit error or a triple bit (or more) error. Table 1, below, summarizes the outputs of the ECC decoder 135 under different conditions:

TABLE 1

| Codeword | kbd_rd | Correctable Error (CE) | Un-correctable Error (UE) |
|---|---|---|---|
| Zero errors | 0 | 0 | 0 |
| Single bit error @(Data/ECC) | 0 | 1 | 0 |
| Single bit error @KBD | 1 | 1 | 0 |
| Double bit error | 1 | 0 | 1 |
| Multi bit error (3-bit or more error) | 1 | 0 | 1 |

Assuming that the input known bad data bit 177 (kbd_wr) was cleared or unset (kbd=0) (e.g., because the system data

171 supplied as input was not known to be bad), then the ECC decoder 135 will produce various outputs based on the number of actual errors in the data received from the memory 110.

In the case where there were no errors, then, as shown in Table 1, the output known bad data bit is 0 (kbd_rd=0), and there is no error, whether correctable (CE) or un-correctable (UE).

In a case where there is a single bit error, that single error can always be corrected by the ECC decoder 135, and the output of the ECC decoder 135 will be CE=1 (indicating a correctable error), kbd_rd=0 (because the known bad data bit was never actually stored in the memory), and the error in the codeword, whether in the system data or in the parity data, is corrected if necessary, such that the output system data matches the input system data.

In a case where there is a double bit error, these errors are always detected by the ECC decoder 135 but not correctable (because correction of two errors is beyond the capabilities of a single error correction double error detection or SECDEC code). In this case, the system outputs the data read from memory, which differs from the data written to memory, reports an uncorrectable error (UE=1), and sets the known bad data bit in association with this data (kbd=1).

The case where there are more than two errors is beyond the capabilities of a single error correction double error detection or SECDED code and therefore the output of the ECC decoder 135 is not held to a high standard of reliability. For example, a detection capability of 3 or more bit errors can be calculated in accordance with:

$$100\%\frac{(\text{Total number of } H\text{-Matrix columns} + 1) * 100\%}{2^{parity}}$$

Nevertheless, in such circumstances the ECC decoder 135 will detect such multi-bit errors approximately 99.6% of the time, based on the calculation:

$$100\% - \frac{(273+1) * 100\%}{65536} \approx 99.6\%$$

As such, the ECC decoder 135 operates as specified in the case where the input known bad data bit 177 is cleared or unset to 0 (kbd_wr=0).

However, the results are different when the input bad data KBD bit 177 is set (kbd_wr=1).

In the case of no actual errors in the data read from memory 110 (e.g., no errors in the received system data 173 and received check bits 174 read as the codeword $C_e$ from the memory 110), the ECC decoder 135 detects a single error at the known bad data bit, which is corrected to a value of 1, thereby recovering the virtually stored data.

In the case of a single bit error in the data read from memory 110, there are effectively two errors in the data supplied to the SECDED decoding procedure (SECDED_DEC(kbd=0,CW_rd[271:0])—one in the kbd argument and one in the codeword CW_rd. The SECDED decoding procedure can detect these two errors but cannot connect them. This is acceptable behavior from the ECC decoder 135 because the data was already known to be bad (as specified because the input bad data KBD bit 177 is set to 1 or kbd_wr=1) and the data is now further corrupted.

However, a problem arises when there are two errors in the codeword CW_rd. An ECC decoder 135 of a system implementing a SECDED error correction code should always be able to detect the existence of two errors. However, when the input bad data KBD bit 177 is set to 1 or kbd_wr=1), this effectively results in an effective three bits of error and the actual detection rate of errors is about 99.6%.

Figure 3:
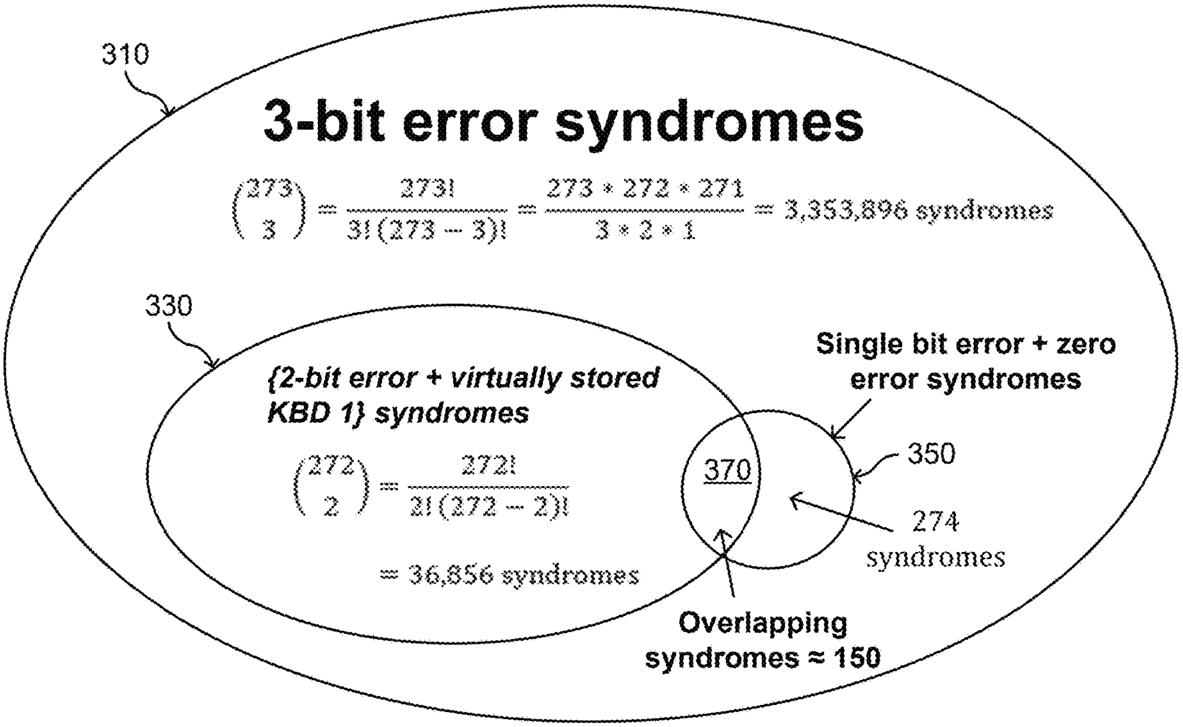
FIG. 3 is a schematic diagram illustrating the space of possible 3-bit error syndromes, the group of those syndromes representing dual bit errors (or 2-bit errors) and a known bad data bit, and the group representing single bit errors (or 1-bit errors) and zero syndrome.

FIG. 3 is a schematic diagram illustrating the space of possible triple bit (or 3-bit) error syndromes 310, a first group of syndromes 330 representing double bit errors and a known bad data bit, and a second group of syndromes 350 representing single bit errors and zero syndrome. As shown in FIG. 3, assuming a codeword that is 273 bits long (256 bits of system data+16 bits of parity data+1 known bad data bit=273) there are 3,353,896 different combinations of exactly three of those bits can be erroneous, so the space of possible triple bit error syndromes 310 in a 273 bit codeword has 3,353,896 syndromes:

$$\binom{273}{3} = \frac{273!}{3!\,(273-3)!} = \frac{273*272*271}{3*2*1} = 3,353,896 \text{ syndromes}$$

The syndromes corresponding to the case where it is known that the known bad data bit is one of those errors (where kbd_wr=1) make up a first group of syndromes 330 of these triple bit errors. In other words, one of the three errors is fixed to be the known bad data bit, and the other two errors are chosen from among the remaining 272 bits of the codeword:

$$\binom{272}{2} = \frac{272!}{2!\,(272-2)!} = 36,856 \text{ syndromes}$$

A second group of syndromes 350 correspond to the case where there are no errors (the zero syndrome) and where there is a single bit error (273 possibilities, because there are 273 bits in the encoded codeword), for a total of 274 possible syndromes.

However, the SECDED[273,257] code is merely capable of correcting a single bit error and detecting a double bit errors. Triple-bit errors are unsupported in the sense that some of the syndromes computed for a triple bit error syndrome have the same value as some syndromes computed for a single bit error syndrome or zero syndrome. This is illustrated in FIG. 3, where the first group of syndromes 330 overlaps with the second group of syndromes 350 in an overlapping region 370. In the example shown in FIG. 3 out of the 36,856 syndromes for a double bit error and a virtually stored known bad data syndrome, 150 of these syndromes can also be interpreted as single bit error syndromes and/or the zero syndrome (e.g. the overlap region 370 corresponds to approximately 150 syndromes). This means that about 150 out of the 36,856 syndromes corresponding to double bit errors and a virtually stored known bad data bit will be mistakenly decoded as a single bit error. As such, the detection capability of the double bit errors and a virtually stored known bad data bit is reduced to:

$$100\% - \frac{150}{36,856} \approx 99.6\%$$

This means that, in approximately 0.4% instances (or approximately one out of 250 instances), an ECC decoder 135 will mistakenly output system data and identify that system data as not having known bad data (kbd_rd=0 or the known bad data bit or flag is cleared or unset) and as having a corrected error (CE=1) or no corrected error (CE=0) even though the codeword read from the memory 110 contained two errors and was also known bad data (the ECC decoder 135 should have reported kbd_rd=1). This failure rate of 1 in 250 does not meet the stated guarantee of single error correction double error detection (SECDED) and can lead to substantial downstream failures of computer systems that depend on assumptions that the ECC memory uphold the SECDED guarantee. In computer systems performing billions of operations, these memory read errors can cause catastrophic system-level (e.g., application-level) problems, such as failures to detect objects in sensor systems for autonomous vehicles, the propagation of errors in avionics systems for aircraft, and silent data corruption in communications systems.

Accordingly, aspects of embodiments of the present disclosure relate to an ECC decoder 135 having a parity-check matrix H that computes syndromes in which all syndromes representing double bit errors and a virtually stored known bad data bit are distinguishable from all syndromes representing single bit errors or zero error syndromes.

Figure 4:
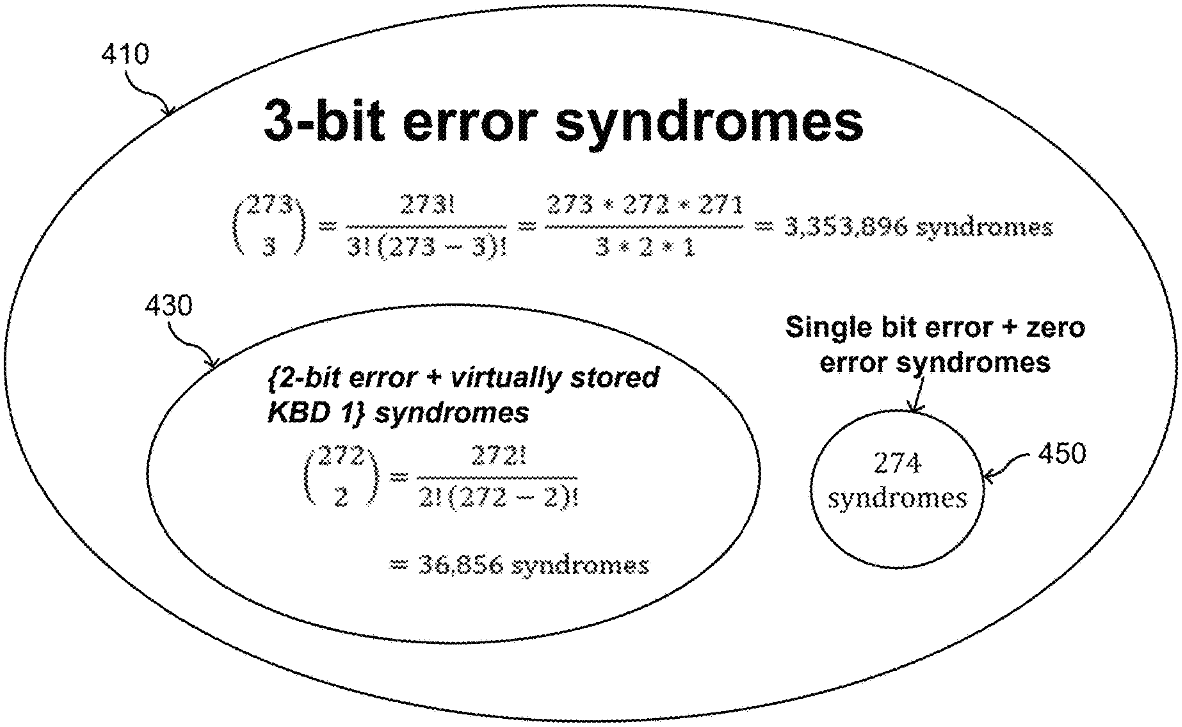
FIG. 4 is a schematic diagram illustrating the space of possible 3-bit error syndromes, the group of those syndromes representing dual bit errors (or 2-bit errors) and a known bad data bit, and the group representing single bit errors (or 1-bit errors) and zero syndrome using a parity-check matrix H, according to one embodiment of the present disclosure.

FIG. 4 is a schematic diagram illustrating the space of possible triple bit error syndromes, the group of those syndromes representing double bit errors and a known bad data bit, and the group of syndromes representing single bit errors and zero syndrome using a parity-check matrix H according to one embodiment of the present disclosure. As shown in FIG. 4, there is no overlap between the syndromes corresponding to double bit errors and a virtually stored known bad data bit 430, and syndromes corresponding to single bit errors or the zero errors 450. In other words, the group of syndromes corresponding to double bit errors and a virtually stored known bad data bit 430 and the group of syndromes corresponding to single bit errors or the zero errors 450 are disjoint (have no intersection or no overlap) in embodiments of the present disclosure.

Assuming a codeword that is 273 bits long (256 bits of system data+16 bits of parity data+1 known bad data bit=273) there are 3,353,896 different combinations of exactly three of those bits can be erroneous corresponding to the space of possible triple bit error syndromes 410, and a first group 430 of 36,856 syndromes correspond to triple bit errors where it is known that the known bad data bit is one of the three errors (where kbd_wr=1). FIG. 4 also shows a second group of syndromes 450 correspond to the case where there are no errors (the zero syndrome) and where there is a single bit error (273 possibilities, because there are 273 bits in the encoded codeword), for a total of 274 possible syndromes.

To achieve this result, a parity-check matrix H according to embodiments of the present disclosure satisfy four properties (or conditions):

A first property (or first condition) is that a parity-check matrix H according to embodiments of the present disclosure does not have any column with all zeros within the column (i.e., has no all zero columns). Phrased differently, every column of the parity-check matrix H has at least one non-zero value (e.g., 1).

A second property (or second condition) is that all columns of a parity-check matrix H according to embodiments of the present disclosure are unique (e.g., no two columns of the parity-check matrix H have the same values).

A third property (or third condition) is that the XOR-sum (bitwise XOR of two columns) of any two columns of a parity-check matrix H according to embodiments of the present disclosure do not equal any other column vector. This property of a parity-check matrix H according to embodiments of the present disclosure enables reliable detection of double bit errors, because the resulting syndromes of double bit errors do not overlap with single bit error syndromes.

For example, for a SECDED[273,257] code with 256 bits of system data, 1 bit virtually stored known bad data (KBD), and 16 bits ECC parity data, then a double bit error can arise as either a double bit error (DBE) in the codeword (CW_rd) read from the memory 110 and the virtually stored known bad data bit was cleared or unset (kbd_wr=0) or a double bit error can arise when there is a single bit error (SBE) in the codeword (CW_rd) read from the memory 110 and the virtually stored known bad data bit was set (kbd_wr=1). The lack of collisions between the syndromes of double bit errors and single bit errors can be expressed as:

$$\text{syndromes}\left(DBE[i] \text{ for } 0 \le i < \binom{273}{2}\right) \neq \text{syndrome } (SBE[j] \text{ for } 0 \le j < 273)$$

A fourth property (or fourth condition) is that the syndromes in the case of dual bit errors in the codeword (CW_rd) with virtually stored KBD bit being set (kbd_wr=1) do not overlap (or collide with) with SBE syndromes or the zero syndrome.

For example, for a SECDED[273,257] code with 256 bits of system data, 1 bit virtually stored known bad data (KBD), and 16 bits ECC parity data, then $$\text{syndromes}\left(DBE[i] \textit{ for } 0 \le i < \binom{273}{2}\right) + \text{syndrome(Virtually stored } KBD \text{ bit)} \neq \{\text{syndrome } (SBE[j] \text{ for } 0 \le j < 273), \text{ Zero syndrome}\}$$

When a ECC decoder 135 uses a parity-check matrix H satisfying the four properties described above to compute syndromes for a codeword, there is no overlap between syndromes corresponding to double bit errors on codeword with virtually stored known bad data bit being set (kbd_wr=1) and syndromes corresponding to the zero syndrome and single bit error syndromes (the sets of syndromes are disjoint). As a result, an ECC decoder 135 using a parity-check matrix H according to embodiments of the present disclosure will reliably detect all double bit errors in the codeword (CW_rd), regardless of the value of the virtually stored known bad data bit (e.g., whether unset or cleared as kbd_wr=0 or set as kbd_wr=1), and without impacting the ability of the ECC decoder 135 to detect and correct single bit errors.

Figure 5:
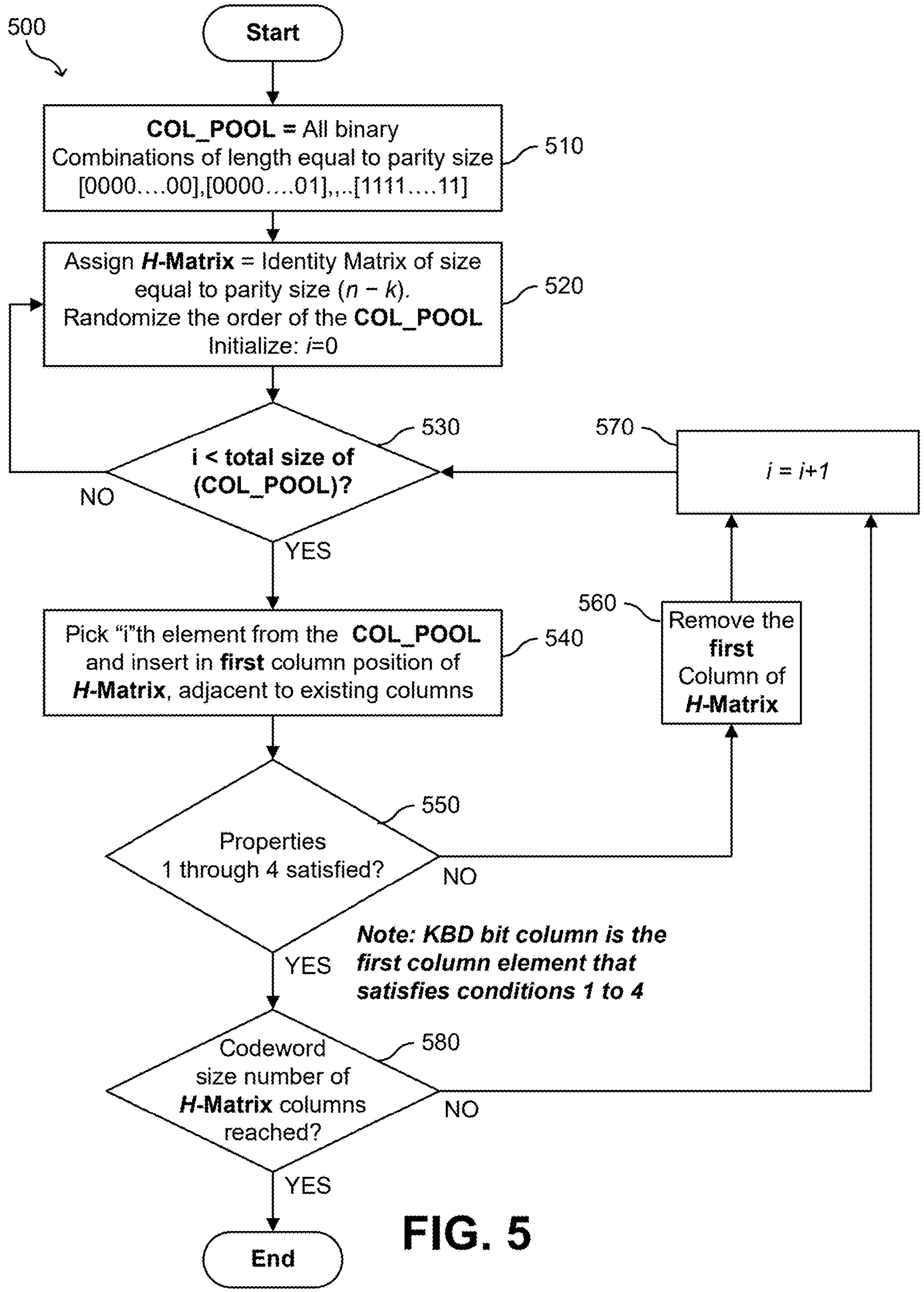
FIG. 5 is a flowchart depicting a method for generating a parity-check matrix H, according to one embodiment of the present disclosure.

In the case of a SECDED code protecting a system data size of 257 bits, the minimum number of parity bits is 10 ($2^r-1 \ge k+r$, where r is number of parity bits and k is number of system data bits—in this example, r=10 is the smallest value of r satisfying $2^r-1 \ge 257+r$). For a SECDED code protecting 257 bits of system data without overlap as shown in FIG. 5, the minimum number of parity bits required to satisfy all four properties described above is 14 bits. SECDED[273,257] has 16 parity bits, so a tiny fraction of all possible matrices satisfy all four properties.

Some aspects of embodiments of the present disclosure relate to methods for constructing a parity-check matrix H according to embodiments of the present disclosure.

FIG. 5 is a flowchart depicting a method 500 for generating a parity-check matrix H according to one embodiment of the present disclosure. In some embodiments of the present disclosure, the operations of method 500 are performed by a computer system including a processor (e.g., one or more processing circuits) and having instructions stored in one or more memories that, when executed by the processor, configure the computer system to implement a method for constructing a parity-check matrix according to some embodiments of the present disclosure. One example of a computer system is shown as computer system 700 described below with respect to FIG. 7.

In the illustrated embodiment, a processor of the computer system constructs a parity-check matrix H (or H-matrix) incrementally on a column-by-column basis.

As noted above, a (n−k)×n parity-check matrix H has the structure:

$$H_{(n-k)\times n} = [P^T \mid I_{(n-k)\times(n-k)}]$$

where k is the length in bits of the input system data and known bad data bit (e.g., 257 bits), n is the length in bits of the codeword (e.g., 273 bits), and n−k is the length in bits of the parity data or parity size (e.g., 16 bits).

The right (n−k) columns of the H-matrix are an (n−k)×(n−k) identity matrix $I_{(n-k)\times(n-k)}$. The method 500 relates to creating the k columns on the left side of the parity matrix $H_{(n-k)\times n}$, indicated above as $P^T$, where P is a k×(n−k) parity matrix. Because the identity matrix is already known, the method relates to creating the (n−k) columns of the k×(n−k) parity matrix P.

At 510, the processor generates a pool of candidate columns (COL_POOL) corresponding to all binary combinations having a length equal to the parity size. In this example, the parity size k is 16, so the pool of candidate columns COL_POOL has $2^{16}$ entries: [0000000000000000], [0000000000000001], . . . ,[1111111111111110], [1111111111111111]. In some embodiments, the all zero column is omitted from the pool of candidate columns because it does not satisfy the first property of a parity-check matrix H of embodiments of the present disclosure: [0000000000000001], . . . ,[1111111111111110], [1111111111111111]. In some embodiments, the all zero column and the one-hot columns (having a single value of 1, where the rest of the values are 0) are all omitted from the pool. In some embodiments, every bitstring in the pool of candidate columns has at least two non-zero values.

At 520, the processor initializes the method by initializing the current H-matrix with an identity matrix having the parity size (n−k) (an (n−k)×(n−k) identity matrix $I_{(n\_k)\times(n\_k)}$), randomizing the column pool (e.g., randomizing the order of the candidate columns in the pool), and setting an index counter (i) to zero. For example, in the case of SECDED[273,257], there are 273−257=16 parity bits, so the current H-matrix is initialized to a 16×16 identity matrix:

$$\begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & \ddots & 0 \\ 0 & 0 & 0 & \cdots & 1 \end{bmatrix}$$

Because the order of the candidate columns is randomized, incrementally iterating through values of the index counter i (e.g., one position at a time) allows accessing the candidate columns in the column pool COL_POOL in random order, as discussed in more detail below.

In some embodiments, instead of using an index counter i, a generator is initialized to represent the pool of candidate columns as all binary strings or bitstrings of length k (instead of storing all possible binary strings in memory), and an iterator is used to iterate through the binary strings of the pool of candidate columns in a random order, without repetition.

At 530, the processor checks whether there are still candidate columns available in the pool of candidate columns COL_POOL. For example, this may relate to checking that the index counter i is less than the size of the pool of candidate columns COL_POOL, as shown in FIG. 5 or may relate to checking that the iterator is not empty.

At 540, the processor chooses the next element from the pool of candidate columns COL_POOL and inserts it into the first column position of the current H-matrix, adjacent to the existing columns of the current H-matrix (without replacing any existing columns of the H-matrix), which increases the number of columns of the current H-matrix by one. This may relate to choosing the i-th element from the randomized pool of candidate columns or selecting the next candidate column, randomly, using the iterator. For example, during a first iteration, a randomly selected column shown in bold [001 . . . 1] is added to the left side of the current matrix (initially the identity matrix), where this column immediately to the left of the identity matrix may be referred to as the known bad data (KBD) column:

$$\begin{bmatrix} 0 & 1 & 0 & 0 & \cdots & 0 \\ 0 & 0 & 1 & 0 & \cdots & 0 \\ 1 & 0 & 0 & 1 & \cdots & 0 \\ \vdots & \vdots & \vdots & \vdots & \ddots & 0 \\ 1 & 0 & 0 & 0 & \cdots & 1 \end{bmatrix}$$

Figure 6:
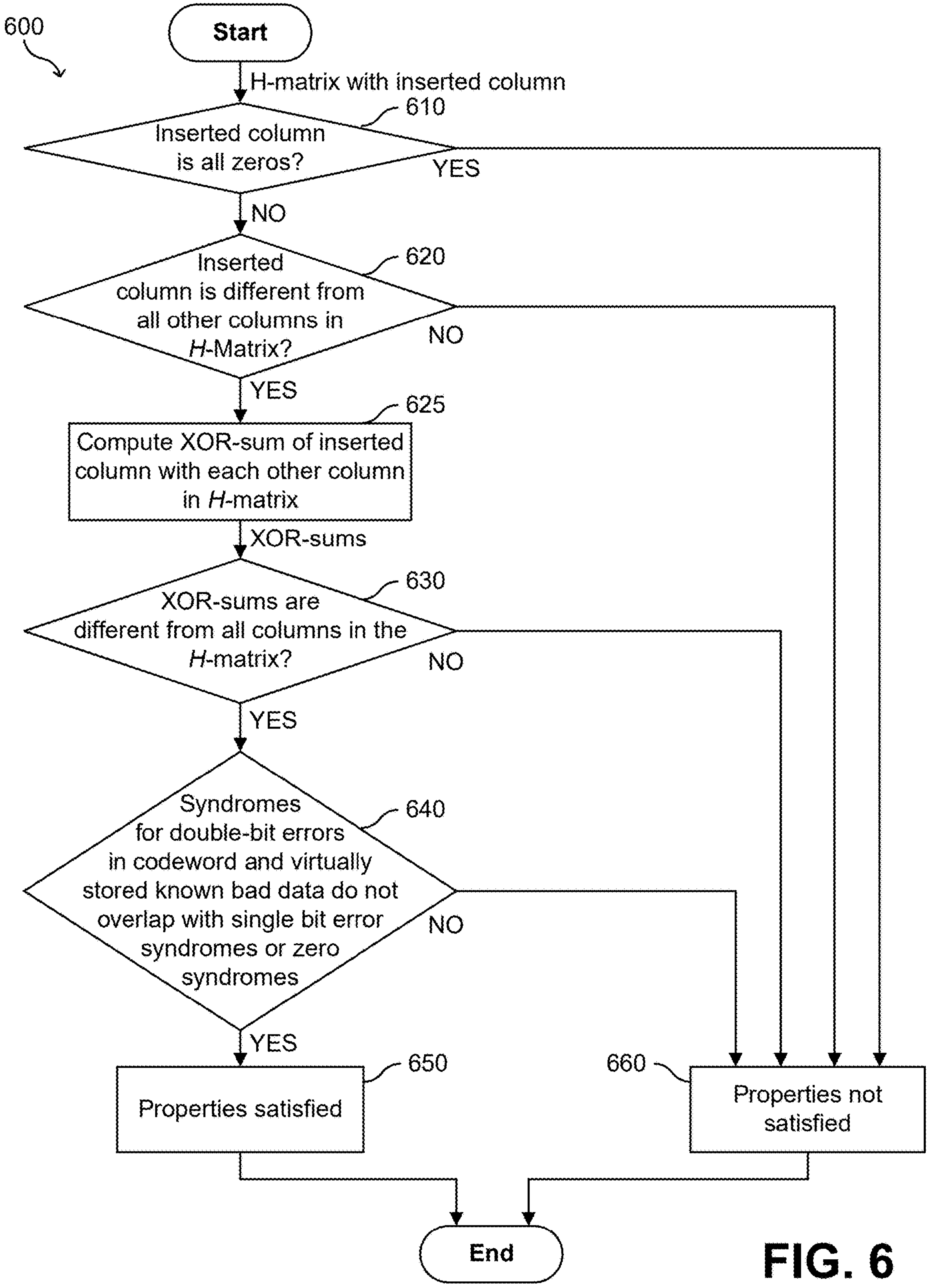
FIG. 6 illustrates a method for verifying the four properties of a parity-check matrix or H-matrix, according to embodiments of the present disclosure.

At 550, the processor checks whether the current H-matrix satisfies the four properties for an H-matrix according to embodiments of the present disclosure. FIG. 6 illustrates a method 600 for verifying the four properties of a parity-check matrix or H-matrix according to embodiments of the present disclosure.

At 610, the processor checks the first property that the inserted column is not all zeroes or the zero column. If so, then the properties of the H-matrix are not satisfied and the check ends at 660. If the inserted column is not all zeroes, then the check proceeds (based on maintaining a loop invariant that none of the columns already present in the H-matrix is all zeroes). In cases where the zero column was omitted from the pool of candidate columns COL_POOL, 610 can be skipped over or omitted, because the inserted column will never be selected from the pool of candidate columns COL_POOL.

At 620, the processor checks the second property that all of the columns are unique by checking that the inserted column is different from all of the other columns already present in the current H-matrix. If not, then the properties of the H-matrix are not satisfied and the check ends at 660. If the inserted column is different from all other columns in the H-matrix, then the check proceeds (based on maintaining a loop invariant that all of the columns already present in the H-matrix are different from one another or unique). In cases where the one-hot columns are omitted from the pool of candidate columns COL_POOL, and where the candidate columns are selected from the pool of candidate columns without repetition, 620 can be skipped over or omitted, because only possible duplicate columns would be with the identity matrix I portion of the H-matrix (which contains all of the possible one-hot columns) and columns that were previously inserted from the pool of candidate columns.

At 625, the processor computes a plurality of the XOR-sums (or bitwise XORs of columns) between the inserted column and each other column present in the H-matrix.

At 630, the processor checks the third property by comparing each of the XOR sums with each of the columns of the H-matrix. If any of the XOR sums is equal to an existing column of the H-matrix, then the third property is not satisfied, and the process ends at 660.

At 640, the processor checks the fourth property by computing a first group of syndromes for double-bit errors in the codeword and a virtually stored known bad data bit and a second group of syndromes for single bit errors and the zero syndrome and verifying that there is no overlap between the first group of syndromes and the second group of syndromes. In other words, the processor checks whether the first group of syndromes and the second group of syndromes are disjoint. The first group of syndromes is computed by first computing the XOR sum of every pair of columns, excluding the KBD column (which is the first column immediately to the left of the identity matrix) in the H-matrix, then adding the KBD column to each of these XOR sums. If there is any overlap (e.g., same syndrome computed for a double-bit error with a virtually stored KBD bit as for a single-bit error or the zero-error syndrome), then the fourth property is not satisfied and the process ends at 660. If the first group of syndromes and the second group of syndromes are disjoint (e.g., have no overlap), then the fourth property is satisfied.

In various embodiments of the present disclosure, the four properties are checked in any order (e.g., in an order different from the order in which the properties are described above) and two or more of the properties may be checked in parallel or concurrently. In addition, as noted above, some properties can be omitted from a checking process if those properties are satisfied by construction of the matrix (e.g., there is no need to check that none of the columns has all zeroes) If all four properties are satisfied (the first property at 610, the second property at 620, the third property at 630, and the fourth property at 640), then at 650 the process ends, indicating that the newly inserted column to the H-matrix satisfies the conditions.

At 550, the processor uses the output of the method 600 to determine whether to proceed to 560 or to 580. In a case where the four properties are not satisfied, then at 560 the processor removes the newly-inserted candidate column from the H-matrix and, at 570, proceeds with incrementing the index counter i, which has the effect of selecting the next candidate column from the pool of candidate columns COL_POOL, assuming that there are more candidate columns left, as checked at 530. If there are more candidate columns left, then the loop repeats by inserting the next candidate column to the H-matrix at 540 and testing whether the current H-matrix with this new candidate column satisfies the four properties at 550.

If there are no more candidate columns available, then the current attempt to generate a satisfactory H-matrix has failed, and the process restarts at 520 by re-initializing the current H-matrix to an (n−k)×(n−k) identity matrix, reinitializing the index counter to 0, and creating a new randomization of the pool of candidate columns COL_POOL, where changing the order in which the candidate columns may have a different result.

In a case where the current H-matrix with this new candidate column does satisfy the four properties, then at 580 the processor retains the new candidate column in the current-H-matrix and determines whether the desired number of columns is reached in the H-matrix (e.g., whether the H-matrix now has n columns). If the desired number of columns has not yet been reached (e.g., the number of columns in the current H-matrix is less than n), then the processor proceeds with selecting the next candidate column from the pool of candidate columns COL_POOL, such as by incrementing the index counter i at 570 and performing another iteration of the loop starting at 530. Continuing the above example, during each iteration, additional columns are added to the left side of the current H-matrix, where an example new column [101 . . . 0] is shown below in bold:

$$\begin{bmatrix} 1 & \cdots & 0 & 1 & 0 & 0 & \cdots & 0 \\ 0 & \cdots & 0 & 0 & 1 & 0 & \cdots & 0 \\ 1 & \cdots & 1 & 0 & 0 & 1 & \cdots & 0 \\ \vdots & \cdots & \vdots & \vdots & \vdots & \vdots & \ddots & 0 \\ 0 & \cdots & 1 & 0 & 0 & 0 & \cdots & 1 \end{bmatrix}$$

If the desired number of columns has been added (for a total of n columns), then the current H-matrix is output as an (n−k)×n parity-check matrix ($H_{(n-k)\times n}$) according to an embodiment of the present disclosure.

Accordingly, FIGS. 5 and 6 depict aspects of embodiments of the present disclosure relating to methods for generating an H-matrix that allows an ECC decoder to reliably detect double-bit (or dual-bit or 2-bit) errors in received codewords that have a virtually stored known bad data bit by using the H-matrix to compute first syndromes corresponding to double-bit errors with virtually stored known bad data bit set to a value of 1 that are distinguished from (or separate from or distinct from or have no overlap) second syndromes corresponding to codewords with single bit errors or zero errors (e.g., the group of first syndromes and the group of second syndromes are disjoint).

While aspects of embodiments of the present disclosure are described above in the context of a SECDED[273,257] code storing 256 bits of system data and virtually storing one bit of known bad data in 272 total bits, embodiments of the present disclosure are not limited thereto. For example, aspects of embodiments of the present disclosure can also be applied to a SECDED[545,529] code, where bit 528 may be used to store a known bad data bit, and the DRAM stores 544 bits per codeword, with the known bad data bit being virtually stored.

According to one embodiment of the present disclosure, a system includes: a memory; and an error correction code (ECC) memory controller configured to read data stored in the memory, the data including a read codeword including read system data and read parity data, the ECC memory controller including an ECC decoder configured to: compute a syndrome based on the read codeword using a parity-check matrix including a plurality of columns, wherein a first group of syndromes calculated by the parity-check matrix in a case where the read codeword has a double-bit error and a virtually stored known bad data bit is set and a second group of syndromes calculated by the parity-check matrix in a case where the read codeword has a single-bit error or zero errors are disjoint; and in a case where the read codeword received has a double bit error and a virtually stored known bad data bit, detect an error in the data and output an indication of detection of the error.

Each of the plurality of columns of the parity-check matrix may include at least one non-zero value, the plurality of columns of the parity-check matrix may be unique, and each of the plurality of columns may be different from an XOR-sum of any two columns of the parity-check matrix.

The ECC memory controller may further include an ECC encoder configured to: compute a write codeword based on input system data and an input known bad data bit using a generator matrix, the ECC encoder virtually storing the input known bad data bit by including the input system data and write parity data computed by the generator matrix in the write codeword and without including the input known bad data bit in the write codeword, and the ECC memory controller may be configured to write the write codeword to the memory.

The ECC memory controller may further include an ECC encoder configured to: compute a write parity data based on input system data and an input known bad data bit using a generator matrix; and generate a write codeword having the input system data and the write parity data to virtually store the input known bad data bit, and the ECC memory controller may be configured to write the write codeword to the memory.

The memory may include dynamic random-access memory.

The memory controller may be integrated in a system-on-chip.

The ECC decoder may include a read-only memory storing the parity-check matrix.

According to one embodiment of the present disclosure, a method includes: generating, by a processor, a pool of candidate columns corresponding to binary bitstrings having a length equal to a parity size of an error correction code (ECC); randomizing an order the pool of candidate columns; initializing, by the processor, a current parity-check matrix to an identity matrix of size equal to the parity size; iteratively adding columns to the current parity-check matrix until the current parity-check matrix has a number of columns equal to a codeword size of the error correction code, each iteration including: inserting a candidate column from the pool of candidate columns in a first column position of the current parity-check matrix; and testing whether the current parity-check matrix satisfies a plurality of properties including a property wherein a first group of syndromes computed by the current parity-check matrix for double-bit errors in system data and a virtually stored known bad data bit and a second group of syndromes computed by the current parity-check matrix for single bit errors or zero errors are disjoint; and outputting the current parity-check matrix as a parity-check matrix to implement an ECC decoder of the error correction code.

The plurality of properties may further include a second property wherein a plurality of XOR-sums of the candidate column with each of the other columns of the current parity-check matrix is different from each of the other columns of the current parity-check matrix.

Each binary bitstring in the pool of candidate columns may have at least two non-zero values.

The method may further include: in response to determining that the current parity-check matrix does not satisfy the plurality of properties, removing the candidate column from the first column position of the current parity-check matrix; and proceeding with another iteration.

The method may further include, in response to determining that the current parity-check matrix satisfies the plurality of properties, keeping the candidate column in the current parity-check matrix, and proceeding with another iteration.

The method may further include determining whether the number of columns in the current parity-check matrix is equal to the codeword size.

According to one embodiment of the present disclosure, a non-transitory computer-readable medium includes stored instructions, which when executed by a processor, cause the processor to generate a digital representation of an integrated circuit including: an error correction code (ECC) memory controller configured to read data stored in a memory, the data including a read codeword including read system data and read parity data, the ECC memory controller including an ECC decoder configured to: compute a syndrome based on the read codeword using a parity-check matrix including a plurality of columns, wherein a first group of syndromes calculated by the parity-check matrix in a case where the read codeword has a double-bit error and a virtually stored known bad data bit is set and a second group of syndromes calculated by the parity-check matrix in a case where the read codeword has a single-bit error or zero errors are disjoint; and in a case where the read codeword received has a double bit error and a virtually stored known bad data bit, detect an error in the data and output an indication of detection of the error.

Each of the plurality of columns of the parity-check matrix may include at least one non-zero value, the plurality of columns of the parity-check matrix may be unique, and each of the plurality of columns may be different from an XOR-sum of any two columns of the parity-check matrix.

The ECC memory controller may further include an ECC encoder configured to: compute a write codeword based on input system data and an input known bad data bit using a generator matrix, the ECC encoder virtually storing the input known bad data bit by including the input system data and write parity data computed by the generator matrix in the write codeword and without including the input known bad data bit in the write codeword, and the ECC memory controller may be configured to write the write codeword to the memory.

The ECC memory controller may further include an ECC encoder configured to: compute a write parity data based on input system data and an input known bad data bit using a generator matrix; and generate a write codeword having the input system data and the write parity data to virtually store the input known bad data bit, and the ECC memory controller may be configured to write the write codeword to the memory.

The memory may include a dynamic random-access memory.

The ECC decoder may be integrated into a system-on-chip.

The ECC decoder may include a read-only memory storing the parity-check matrix.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art. Further, as used herein and in the claims, the phrase "at least one of element A, element B, or element C" is intended to convey any of: element A, element B, element C, elements A and B, elements A and C, elements B and C, and elements A, B, and C.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:

a memory; and an error correction code (ECC) memory controller configured to read data stored in the memory, the data comprising a read codeword comprising read system data and read parity data, the ECC memory controller comprising an ECC decoder configured to:

compute a syndrome based on the read codeword using a parity-check matrix comprising a plurality of columns, wherein a first group of syndromes calculated by the parity-check matrix in a case where the read codeword has a double-bit error and a virtually stored known bad data bit is set and a second group of syndromes calculated by the parity-check matrix in a case where the read codeword has a single-bit error or zero errors are disjoint; and in a case where the read codeword received has a double bit error and a virtually stored known bad data bit, detect an error in the data and output an indication of detection of the error.

2. The system of claim 1, wherein each of the plurality of columns of the parity-check matrix comprises at least one non-zero value, wherein the plurality of columns of the parity-check matrix are unique, and wherein each of the plurality of columns is different from an XOR-sum of any two columns of the parity-check matrix.

3. The system of claim 1, wherein the ECC memory controller further comprises an ECC encoder configured to:

compute a write codeword based on input system data and an input known bad data bit using a generator matrix, the ECC encoder virtually storing the input known bad data bit by including the input system data and write parity data computed by the generator matrix in the write codeword and without including the input known bad data bit in the write codeword, and wherein the ECC memory controller is configured to write the write codeword to the memory.

4. The system of claim 1, wherein the ECC memory controller further comprises an ECC encoder configured to:

compute a write parity data based on input system data and an input known bad data bit using a generator matrix; and generate a write codeword having the input system data and the write parity data to virtually store the input known bad data bit, and wherein the ECC memory controller is configured to write the write codeword to the memory.

5. The system of claim 1, wherein the memory comprises dynamic random-access memory.

6. The system of claim 1, wherein the memory controller is integrated in a system-on-chip.

7. The system of claim 1, wherein the ECC decoder comprises a read-only memory storing the parity-check matrix.

8. A non-transitory computer-readable medium comprising stored instructions, which when executed by a processor, cause an error correction code (ECC) memory controller to read data stored in a memory, the data comprising a read codeword comprising read system data and read parity data, wherein the stored instructions further cause the ECC memory controller to:

compute a syndrome based on the read codeword using a parity-check matrix comprising a plurality of columns, wherein a first group of syndromes calculated by the parity-check matrix in a case where the read codeword has a double-bit error and a virtually stored known bad data bit is set and a second group of syndromes calculated by the parity-check matrix in a case where the read codeword has a single-bit error or zero errors are disjoint; and in a case where the read codeword received has a double bit error and a virtually stored known bad data bit, detect an error in the data and output an indication of detection of the error.

9. The non-transitory computer-readable medium of claim 8, wherein each of the plurality of columns of the parity-check matrix comprises at least one non-zero value, wherein the plurality of columns of the parity-check matrix are unique, and wherein each of the plurality of columns is different from an XOR-sum of any two columns of the parity-check matrix.

10. The non-transitory computer-readable medium of claim 8, wherein the ECC memory controller further comprises an ECC encoder configured to:

compute a write codeword based on input system data and an input known bad data bit using a generator matrix, the ECC encoder virtually storing the input known bad data bit by including the input system data and write parity data computed by the generator matrix in the write codeword and without including the input known bad data bit in the write codeword, and wherein the ECC memory controller is configured to write the write codeword to the memory.

11. The non-transitory computer-readable medium of claim 8, wherein the ECC memory controller further comprises an ECC encoder configured to:

compute a write parity data based on input system data and an input known bad data bit using a generator matrix; and generate a write codeword having the input system data and the write parity data to virtually store the input known bad data bit, and wherein the ECC memory controller is configured to write the write codeword to the memory.

12. The non-transitory computer-readable medium of claim 8, wherein the memory comprises a dynamic random-access memory.

13. The non-transitory computer-readable medium of claim 8, wherein the ECC memory controller is integrated into a system-on-chip.

14. The non-transitory computer-readable medium of claim 8, wherein the ECC memory controller comprises a read-only memory storing the parity-check matrix.

* * * * *